US008631426B2

(12) United States Patent
Yu et al.

(10) Patent No.: US 8,631,426 B2
(45) Date of Patent: Jan. 14, 2014

(54) PICKUP DAMPER AND DISK DRIVE INCLUDING THE SAME

(75) Inventors: Heon-seung Yu, Suwon-si (KR); Young-sun Jung, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/547,419

(22) Filed: Jul. 12, 2012

(65) Prior Publication Data

US 2013/0031571 A1 Jan. 31, 2013

(30) Foreign Application Priority Data

Jul. 29, 2011 (KR) ........................ 10-2011-0076147

(51) Int. Cl.
*G11B 33/14* (2006.01)
(52) U.S. Cl.
USPC ............................. 720/671; 720/677
(58) Field of Classification Search
USPC ................. 720/648, 651, 671–679
See application file for complete search history.

(56) References Cited

U.S. PATENT DOCUMENTS

| 7,296,279 B2 * | 11/2007 | Pan | 720/651 |
| 7,421,721 B2 * | 9/2008 | An | 720/677 |
| 2004/0111735 A1 * | 6/2004 | Yang | 720/671 |
| 2005/0210487 A1 * | 9/2005 | Hara et al. | 720/676 |
| 2006/0080691 A1 * | 4/2006 | Chiu et al. | 720/676 |
| 2006/0080692 A1 * | 4/2006 | Yang et al. | 720/676 |
| 2009/0064215 A1 * | 3/2009 | Ezawa et al. | 720/659 |

FOREIGN PATENT DOCUMENTS

| JP | 10-269723 A | 10/1998 | |
| JP | 11066770 A * | 3/1999 | ............ G11B 21/02 |
| KR | 10-2001-0027570 A | 4/2001 | |
| KR | 10-2006-0083350 A | 7/2006 | |
| KR | 10-2006-0094353 | 8/2006 | |
| KR | 10-0745784 | 8/2007 | |
| KR | 10-2009-0075094 A | 7/2009 | |

OTHER PUBLICATIONS

English translation of JP 11066770 A.*
Korean Office Action issued Oct. 12, 2012 in counterpart Korean Patent Application No. 10-2011-0076147 (4 pages, in Korean).

* cited by examiner

*Primary Examiner* — Nathan Danielsen
(74) *Attorney, Agent, or Firm* — NSIP Law

(57) ABSTRACT

A pickup damper is provided. The pickup damper is configured to be installed adjacent to a plurality of guide shafts installed on opposite sides of an opening of a base chassis, configured to collide with a pickup and relieve shock via at least three steps in response to an external shock being applied, and configured to prevent the pickup from colliding with the guide shafts to protect the pickup.

20 Claims, 3 Drawing Sheets

111
PICKUP DAMPER AND DISK DRIVE INCLUDING THE SAME

CROSS-REFERENCE TO RELATED PATENT APPLICATION

This application claims the benefit under 35 U.S.C. §119(a) of Korean Patent Application No. 10-2011-0076147 filed on Jul. 29, 2011, in the Korean Intellectual Property Office, the entire disclosure of which is incorporated herein by reference for all purposes.

BACKGROUND

1. Field

The following description relates to a pickup damper and a disc drive including the same.

2. Description of the Related Art

A disc drive is a device that irradiates light onto a disc to record and read information. The disc may be a compact disc (CD) or a digital video disc (DVD).

The disc drive includes a pickup, a spindle motor, and a step motor. The pickup reproduces data stored on a disc or records data onto the disc. The spindle motor accommodates a disc on a turn table and rotates the disc. The step motor linearly reciprocates the pickup in a radial direction of the disc.

Normally, a pickup linearly reciprocates in a radial direction of a disc by a lead screw driven by a step motor. However, due to an external shock, the pickup may abnormally move along a lead screw and a guide shaft. In this case, the pickup may be externally shocked to contact other components of the disc drive. Since the pickup includes a laser diode for irradiating light and an optical system, the laser diode and the optical system may be damaged or an aberration of the optical path may occur due to the external shock. The optical system forms an optical path along which the light irradiated from the laser diode is transmitted. In particular, a drop test of a disc drive is performed in order to measure the durability of the disc drive during manufacture of the disc drive. In this case, the shock is also applied to the pickup. Thus, there may be a need for a device for relieving the shock applied the pickup due to an external source.

Various methods for preventing shock from being applied to a pickup may have been disclosed. The methods for preventing the shock may have been published in patents that disclose an elastic member for relieving shock applied to a pickup.

SUMMARY

According to an aspect, a pickup damper is provided. The pickup damper is configured to be installed adjacent to a plurality of guide shafts installed on opposite sides of an opening of a base chassis, configured to collide with a pickup and relieve shock via a plurality of steps in response to an external shock being applied, and configured to prevent the pickup from colliding with the guide shafts to protect the pickup.

The pickup damper may include a plurality of elastic protrusions configured to be installed adjacent to a second guide shaft facing a first guide shaft connected to a step motor on the base chassis, and configured to protrude toward the second guide shaft, and a protrusion configured to protrude from a pickup base at one side of the second guide shaft. The step motor may linearly reciprocate the pickup through the plurality of guide shafts.

The plurality of elastic protrusions each may be formed as a plastic mold and may be inserted into the base chassis.

The protrusion may be integrally formed with the base chassis and may be formed by partially bending the base chassis.

One end of the second guide shaft may be installed adjacent to a turn table on which a disc is to be accommodated.

The plurality of elastic protrusions may be spaced apart from each other by a predetermined interval, and the protrusion may be spaced apart from each of the plurality of elastic protrusions by a predetermined interval.

The protrusion may be formed of substantially the same material as the base chassis.

The protrusion may be formed of aluminum.

The plurality of steps may include at least three steps.

In another aspect, a disc drive is provided. The disc drive includes a main frame, a tray on which a disc is configured to be mounted and which is pushed out of or into the main frame, a base chassis configured to be installed on the main frame so as to be moved in up and down directions and on which a pickup is installed so as to linearly reciprocate, and a pickup damper is configured to be installed adjacent to a plurality of guide shafts installed on opposite sides of an opening of a base chassis, configured to collide with a pickup and relieve shock via a plurality of steps in response to an external shock being applied, and configured to prevent the pickup from colliding with the guide shafts to protect the pickup.

The pickup damper may include a plurality of elastic protrusions configured to be installed adjacent to a second guide shaft facing a first guide shaft connected to a step motor on the base chassis and protrude toward the second guide shaft, and a protrusion that protrudes from a pickup base at one side of the second guide shaft. The step motor may linearly reciprocate the pickup through the plurality of guide shafts.

The plurality of elastic protrusions each may be formed as a plastic mold and may be inserted into the base chassis.

The protrusion may be integrally formed with the base chassis and may be formed by partially bending the base chassis.

One end of the second guide shaft may be installed adjacent to a turn table on which a disc is to be accommodated.

The plurality of elastic protrusions may be spaced apart from each other by a predetermined interval, and the protrusion may be spaced apart from each of the plurality of elastic protrusions by a predetermined interval.

In another aspect, a disc drive is provided. The disc drive includes a main frame, a tray on which a disc is configured to be mounted and which is pushed out of or into the main frame, a base chassis configured to be installed on the main frame so as to be moved in up and down directions and on which a pickup is installed so as to linearly reciprocate, and a pickup damper is configured to be installed adjacent to a plurality of guide shafts installed on opposite sides of an opening of a base chassis, configured to collide with a pickup and relieve shock via a plurality of steps in response to an external shock being applied, and configured to prevent the pickup from the guide shafts to protect the pickup. The pickup damper includes a plurality of elastic protrusions configured to be installed adjacent to a second guide shaft facing a first guide shaft connected to a step motor on the base chassis and protrude toward the second guide shaft, and a protrusion that protrudes from a pickup base at one side of the second guide shaft. The step motor linearly reciprocates the pickup through the plurality of guide shafts.

The plurality of elastic protrusions each may be formed as a plastic mold and may be inserted into the base chassis.

The protrusion may be integrally formed with the base chassis and may be formed by partially bending the base chassis.

One end of the second guide shaft may be installed adjacent to a turn table on which a disc is to be accommodated.

The plurality of elastic protrusions may be spaced apart from each other by a predetermined interval, and the protrusion may be spaced apart from each of the plurality of elastic protrusions by a predetermined interval.

Other features and aspects may be apparent from the following detailed description, the drawings, and the claims.

Figure 1:
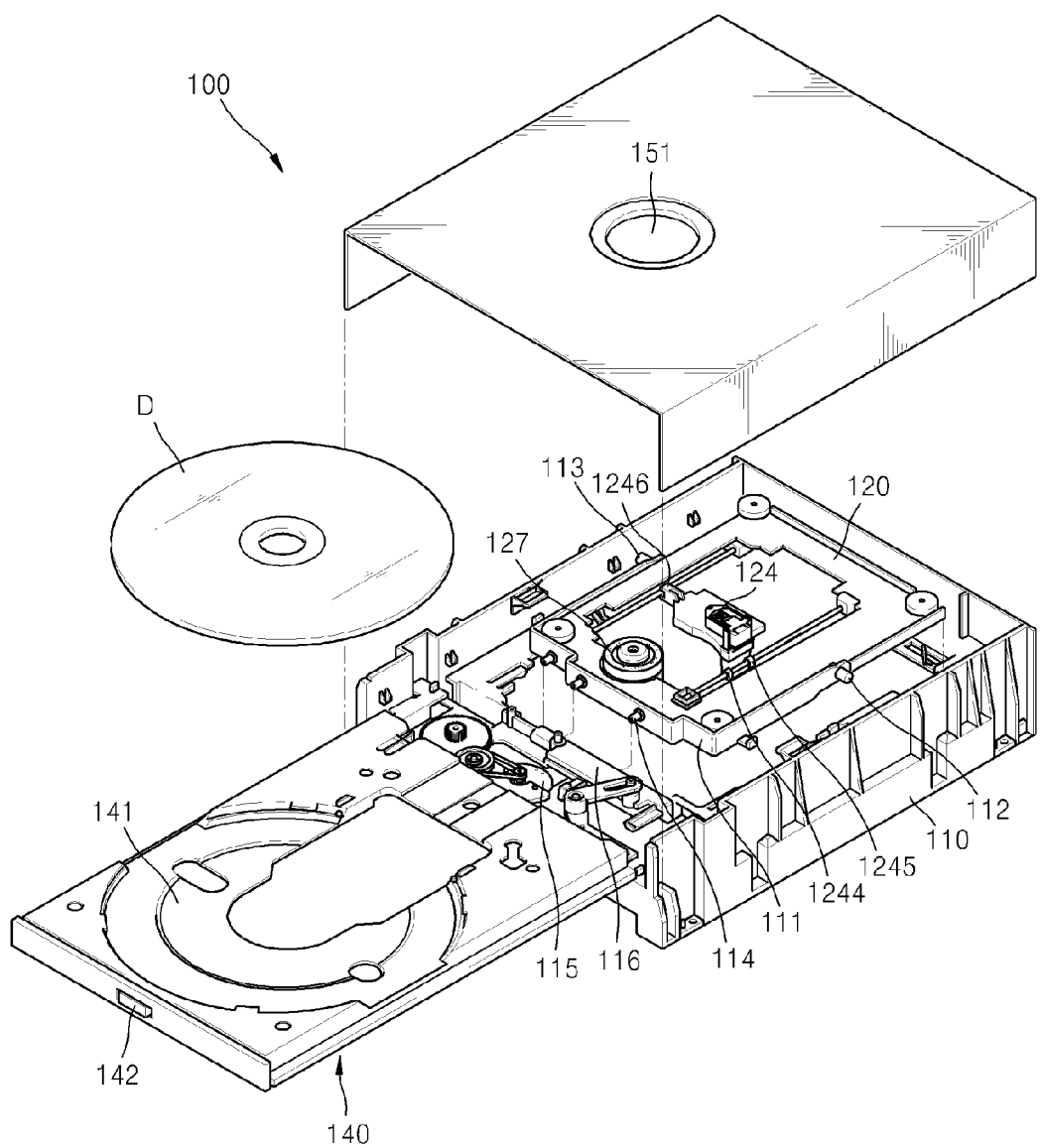
FIG. 1 is an exploded perspective view illustrating an example of a disc drive including a pickup damper.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION OF THE INVENTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 2:
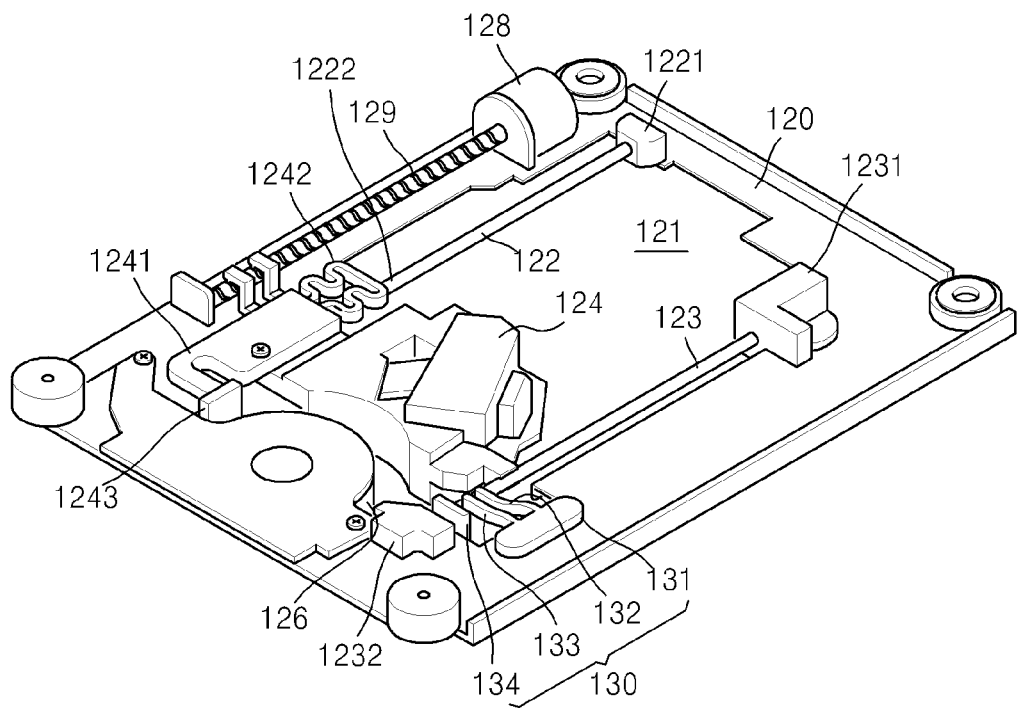
FIG. 2 is a bottom view illustrating an example of a base chassis including the pickup damper shown in FIG. 1.

FIG. 1 illustrates an example of an exploded perspective view of an example of a disc drive 100 including a pickup damper. FIG. 2 illustrates an example of a bottom view of a base chassis 120 including the pickup damper 130 shown in FIG. 1.

Referring to FIGS. 1 and 2, the disc drive 100 includes a main frame 110, a tray 140 configured to be pushed out of or into the main frame 110 and to include a mounting portion 141 on which a disc D is to be mounted, a sub frame 111 configured to be rotatably installed on the main frame 110, and the base chassis 120 supported by the sub frame 111.

A sliding member 116 configured to be installed in the main frame 110 to slide in conjunction with a driving motor 115 in a perpendicular direction to a direction in which the tray 140 may be pushed out of or into the main frame 110. A plurality of cam holes (not shown) may be formed in the sliding member 116 and a plurality of cam protrusions 114 formed on the sub frame 111 may be configured to slide along paths of the cam holes. Thus, the sub frame 111 may be moved in up and down directions with respect to rotation axes 112 and 113 while being supported by the main frame 110. In this case, the base chassis 120 may also be moved in up and down directions by the sub frame 111.

The base chassis 120 includes an opening 121, a turn table 127 that may accommodate the disc D on the tray 140 and the tray 140 may move into the main frame 110, a spindle motor 126 (see FIG. 2) that may be coaxially installed with the turn table 127 and rotate the turn table 127, and a pickup unit 124 that may slide in a radial direction of the disc D accommodated on the turn table 127 to record information on the disc D or to reproduce information recorded on the disc D. The turn table 127, the spindle motor 126, and the pickup unit 124 are installed around the opening 121.

A first guide shaft 122 and a second guide shaft 123 are configured to face each other across the opening 121 in a longitudinal direction. The longitudinal direction may correspond with a direction in which the tray 140 is pushed out of or into the main frame 110. A plurality of fix units 1221 and 1222 may fix the first guide shaft 122 to the base chassis 120. A plurality of fix units 1231 and 1232 may fix the second guide shaft 123 to the base chassis 120. The fix units 1221, 1222, 1231, and 1232 may each be formed as a plastic mold and fix opposites ends of the first guide shaft 122 and opposite ends of the second guide shaft 123 to the base chassis 120.

A step motor 128 and a lead screw 129 are installed adjacent to the guide shaft 122. The lead screw 129 may be configured to rotate in conjunction with the step motor 128 and connected to the pickup unit 124 to linearly reciprocate the pickup unit 124 in a radial direction of the disc D. The pickup unit 124 and the lead screw 129 may be connected to the pickup guide 1241 such that power may be transferred by the pickup guide 1241 to the pickup unit 124.

One side of the pickup unit 124 may be slidably connected to the first guide shaft 122 through two connection units 1244 and 1245. Since the two connection units 1244 and 1245 are formed to surround the first guide shaft 122, it may be very difficult to separate the two connection units 1244 and 1245 from the first guide shaft 122 without damaging the two connection units 1244 and 1245 or the guide shaft 122.

The other side of the pickup unit 124 may be slidably connected to the second guide shaft 123 through a connection unit 1246. Since the connection unit 1246 is partially opened, the connection unit 1246 may be configured to be detachable from the second guide shaft 123.

Thus, in response to an abnormal external shock being applied to the disc drive 100, the pickup unit 124 may slide through the first guide shaft 122 and the second guide shaft 123. In response to an external shock being excessively applied to the disc drive 100, the connection unit 1246 may be separated from the second guide shaft 123, and thus, the pickup unit 124 may be separated from the second guide shaft 123. In addition, the pickup unit 124 may collide with the spindle motor 126 that is shocked.

In order to prevent the collision of the pickup unit 124 and the spindle motor 126, the disc drive 100 may include the pickup damper 130.

The pickup damper 130 may be installed adjacent to one side of the second guide shaft 123. As an example, the fix unit 1232 around which the spindle motor 126 may be installed, may be formed as a plastic mold, and the fix unit 1232 may include a first buffer protrusion portion 132, a second buffer protrusion portion 133, and a third buffer protrusion portion 134. The first buffer protrusion portion 132 may extend from a body 131 fixed to the base chassis 120 toward an upper portion of the second guide shaft 123 by a predetermined length. The second buffer protrusion portion 133 may be spaced apart from the first buffer protrusion portion 132 by a predetermined interval. The third buffer protrusion portion 134 may be formed by bending the base chassis 120 to protrude towards the upper portion of the base chassis 120 by a predetermined length and may be spaced apart from the second buffer protrusion portion 133 by a predetermined interval.

The first buffer protrusion portion 132 and the second buffer protrusion portion 133 are configured to be inserted into the base chassis 120. The first buffer protrusion portion 132 and the second buffer protrusion portion 133 are each formed as a plastic mold, and thus, the first buffer protrusion portion 132 and the second buffer protrusion portion 133 have an elasticity force. The third buffer protrusion portion 134 may be formed of substantially the same material as the material used to form the base chassis 120. The third buffer protrusion 134 and the base chassis 120 may be formed of aluminum.

Dampers 1242 and 1243 may be formed on opposite sides of the pickup guide 1241, respectively. The dampers 1242 and 1243 may prevent the pickup guide 1241 from colliding with the base chassis 120.

Figure 3:
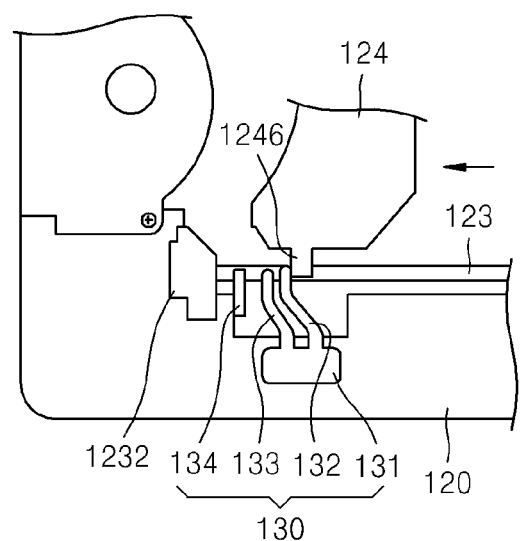
FIGS. 3 through 5 are diagrams illustrating an example of an operation of the pickup damper.
Figure 4:
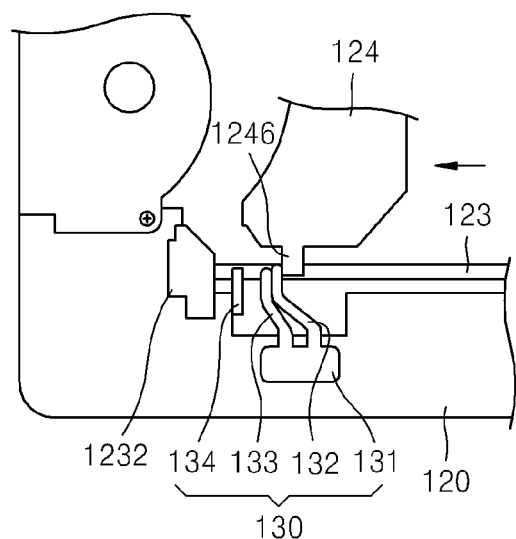
Figure 5:
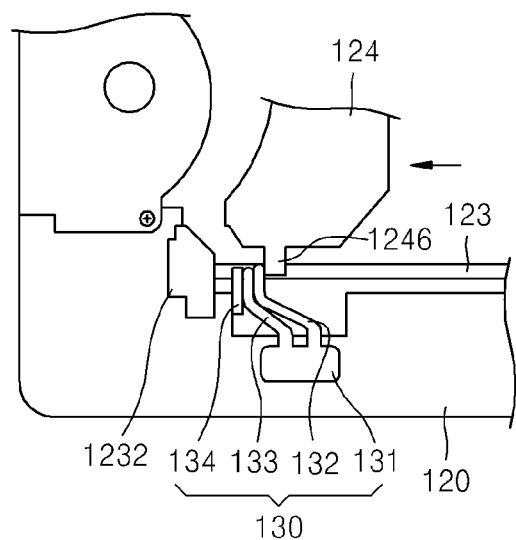

FIGS. 3 through 5 illustrate an example of an operation of the pickup damper 130.

Referring to FIG. 3, in response to abnormal external shock being applied, for example, an abnormal external shock applied in a drop test, the pickup unit 124 may slide in a direction indicated by an arrow and substantially simultaneously the connection unit 1246 may contact the first buffer protrusion portion 132. Due to the pickup unit 124 contacting the first buffer protrusion portion 132, a shock applied to the pickup unit 124 may be significantly reduced.

Referring to FIG. 4, due to the external shock, the pickup unit 124 may push the first buffer protrusion portion 132 such that the first buffer protrusion portion 132 contacts the second buffer protrusion portion 133. Since the first buffer protrusion portion 132 has an elastic body, the first buffer protrusion portion 132 may be elastically deformed. In this case, due to the pickup unit 124 contacting the first buffer protrusion portion 132 and the second buffer protrusion portion 133, the shock applied to the pickup unit 124 may be further reduced.

Referring to FIG. 5, due to the external shock, the pickup unit 124 may push the first buffer protrusion portion 132 and the second buffer protrusion portion 133 such that the second buffer protrusion portion 133 may contact the third buffer protrusion portion 134. Since the second buffer protrusion portion 133 has an elastic body, the second buffer protrusion portion 133 may be elastically deformed. As an aspect, the third buffer protrusion portion 134 may not be elastically deformed and may contact the second buffer protrusion portion 133. In this case, due to the pickup unit 124 contacting the first buffer protrusion portion 132, the second buffer protrusion portion 133, and the third buffer protrusion portion 134, the shock applied to the pickup unit 124 may be yet further reduced.

A switch 142 may be installed on a front surface of the tray 140 and may output a signal for loading or unloading the tray 140 on or from the main frame 110.

An upper surface of the main frame 110 is covered by the tray 140. A clamp 151 for clamping the disc D installed on the turn table 127 may be installed on the tray 127.

According to the present application, a pickup damper and a disc drive including the pickup damper may gradually relieve shock applied to a pickup and substantially simultaneously may prevent the pickup from being separated from a guide shaft in response to a drop test being performed or an external shock being applied.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A pickup damper, comprising:
a body;
a plurality of elastic protrusions that protrude from one side of the body; and
a protrusion that protrudes from a base chassis,
wherein the pickup damper is installed adjacent to a plurality of guide shafts which are installed on opposite sides of an opening of the base chassis, and the pickup damper is configured to collide with a pickup and relieve shock via the plurality of elastic protrusions in response to an external shock being applied, and prevent the pickup from colliding with an end of the guide shafts to protect the pickup.

2. The pickup damper of claim 1, wherein:
the plurality of elastic protrusions are installed adjacent to a second guide shaft facing a first guide shaft connected to a step motor on the base chassis, installed nearer to the second guide shaft than to the first guide shaft, and protrude toward the second guide shaft;
the step motor is configured to linearly reciprocates the pickup through the first and second guide shafts; and
the protrusion protrudes from the base chassis toward the second guide shaft.

3. The pickup damper of claim 2, wherein the plurality of elastic protrusions each is formed as a plastic mold and is inserted into the base chassis.

4. The pickup damper of claim 3, wherein the protrusion is integrally formed with the base chassis and is formed by partially bending the base chassis.

5. The pickup damper of claim 2, wherein one end of the second guide shaft is installed adjacent to a turn table on which a disc is to be accommodated.

6. The pickup damper of claim 2, wherein the plurality of elastic protrusions are spaced apart from each other by a predetermined interval, and
wherein the protrusion is spaced apart from each of the plurality of elastic protrusions by a predetermined interval.

7. The pickup damper of claim 2, wherein the protrusion is formed of substantially the same material as the base chassis.

8. The pickup damper of claim 7, wherein the protrusion is formed of aluminum.

9. The pickup damper of claim 1, wherein the plurality of steps includes at least three steps.

10. A disc drive comprising:
a main frame;
a tray on which a disc is configured to be mounted and which is pushed out of or into the main frame;
a base chassis configured to be installed on the main frame so as to be moved in up and down directions and on which a pickup is installed so as to linearly reciprocate; and
a pickup damper, comprising:
a body;
a plurality of elastic protrusions that protrude from one side of the body, and
a protrusion that protrudes from the base chassis,
wherein the pickup damper is installed adjacent to a plurality of guide shafts which are installed on opposite sides of an opening of the base chassis, and the pickup damper is configured to collide with a pickup and relieve shock via the plurality of elastic protrusions in response to an external shock being applied, and to prevent the pickup from colliding with an end of the guide shafts to protect the pickup.

11. The pickup damper of claim 1, wherein:
the plurality of elastic protrusions are installed adjacent to a second guide shaft facing a first guide shaft connected to a step motor on the base chassis, installed nearer to the second guide shaft than to the first guide shaft, and protrude toward the second guide shaft;
the step motor is configured to linearly reciprocates the pickup through the first and second guide shafts; and
the protrusion protrudes from the base chassis toward the second guide shaft.

12. The disc drive of claim 11, wherein the plurality of elastic protrusions each is formed as a plastic mold and is inserted into the base chassis.

13. The disc drive of claim 12, wherein the protrusion is integrally formed with the base chassis and is formed by partially bending the base chassis.

14. The disc drive of claim 11, wherein one end of the second guide shaft is installed adjacent to a turn table on which a disc is to be accommodated.

15. The disc drive of claim 11, wherein the plurality of elastic protrusions are spaced apart from each other by a predetermined interval, and the protrusion is spaced apart from each of the plurality of elastic protrusions by a predetermined interval.

16. A disc drive comprising:
a main frame;
a tray on which a disc is configured to be mounted and which is pushed out of or into the main frame;
a base chassis configured to be installed on the main frame so as to be moved in up and down directions and on which a pickup is installed so as to linearly reciprocate; and
a pickup damper, comprising:
a body;
a plurality of elastic protrusions that protrude from one side of the body; and
a protrusion that protrudes from the base chassis, wherein:
the pickup damper is installed adjacent to a plurality of guide shafts that are installed on opposite sides of an opening of the base chassis, and the pickup damper is configured to collide with a pickup and relieve shock via the plurality of elastic protrusions in response to an external shock being applied, and prevent the pickup from colliding with an end of the guide shafts to protect the pickup;
the plurality of elastic protrusions are installed adjacent to a second guide shaft facing a first guide shaft connected to a step motor on the base chassis, installed nearer to the second guide shaft than to the first guide shaft, and protrude toward the second guide shaft;
the step motor is configured to linearly reciprocate the pickup through the first and second guide shafts; and
the protrusion protrudes from the base chassis to the second guide shaft.

17. The disc drive of claim 16, wherein the plurality of elastic protrusions each is formed as a plastic mold and is inserted into the base chassis.

18. The disc drive of claim 17, wherein the protrusion is integrally formed with the base chassis and is formed by partially bending the base chassis.

19. The disc drive of claim 16, wherein one end of the second guide shaft is installed adjacent to a turn table on which a disc is to be accommodated.

20. The disc drive of claim 16, wherein the plurality of elastic protrusions are spaced apart from each other by a predetermined interval, and the protrusion is spaced apart from each of the plurality of elastic protrusions by a predetermined interval.

* * * * *